(12) United States Patent
Cordeiro et al.

(10) Patent No.: US 8,233,444 B2
(45) Date of Patent: Jul. 31, 2012

(54) SPECTRUM MANAGEMENT IN DYNAMIC SPECTRUM ACCESS WIRELESS SYSTEMS

(75) Inventors: Carlos Cordeiro, Ossining, NY (US); Kiran Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 839 days.

(21) Appl. No.: 12/066,878

(22) PCT Filed: Sep. 14, 2006

(86) PCT No.: PCT/IB2006/053291
§ 371 (c)(1),
(2), (4) Date: Mar. 14, 2008

(87) PCT Pub. No.: WO2007/031957
PCT Pub. Date: Mar. 22, 2007

(65) Prior Publication Data
US 2008/0225878 A1    Sep. 18, 2008

Related U.S. Application Data (60) Provisional application No. 60/718,127, filed on Sep. 16, 2005, provisional application No. 60/733,520, filed on Nov. 4, 2005.

(51) Int. Cl.
*H04W 4/00* (2009.01)
*H04J 3/14* (2006.01)
(52) U.S. Cl. .................. 370/329; 370/338; 370/341
(58) Field of Classification Search .................. None
See application file for complete search history.

(56) References Cited

U.S. PATENT DOCUMENTS

| | | | |
|---|---|---|---|
| 2002/0188723 A1* | 12/2002 | Choi et al. | 709/225 |
| 2003/0171116 A1* | 9/2003 | Soomro | 455/434 |
| 2004/0248568 A1 | 12/2004 | Lucidarme | |
| 2006/0050708 A1* | 3/2006 | Shapiro et al. | 370/394 |
| 2006/0083205 A1* | 4/2006 | Buddhikot et al. | 370/338 |
| 2006/0251256 A1* | 11/2006 | Asokan et al. | 380/270 |
| 2007/0060055 A1* | 3/2007 | Desai et al. | 455/41.2 |
| 2009/0245287 A1* | 10/2009 | Mueller | 370/476 |

FOREIGN PATENT DOCUMENTS

| | | |
|---|---|---|
| EP | 0920233 A2 | 11/1998 |
| EP | 1473956 A2 | 11/2004 |
| WO | WO2005039134 A1 | 4/2005 |

OTHER PUBLICATIONS

Internet Citation, "Functional Requirements for the 802.22 WRAN Standard", Aug. 2005, XP002425031, URL:www.ieee802.org/22/Meeting_documents/2005_Aug_teleconferences/22-05-0007-39-0000_RAN_Requirements.doc.

S. Haykin, "Cognitive radio: Brain-Empowered Wireless Communications", IEEE journal on Selected Areas in Communications, IEEE Service Center, Piscataway, NJ, USA, Feb. 2005, pp. 201-220, XP0011126474.

* cited by examiner

*Primary Examiner* — Chi Pham
*Assistant Examiner* — Soon-Dong Hyun
(74) *Attorney, Agent, or Firm* — Larry Liberchuk (57) ABSTRACT

A wireless system and method including a medium access control (MAC) layer adapted to transmit and receive spectrum management commands for wireless devices operating in restricted channels.

18 Claims, 3 Drawing Sheets

SPECTRUM MANAGEMENT IN DYNAMIC SPECTRUM ACCESS WIRELESS SYSTEMS

CROSS-REFERENCE TO RELATED APPLICATIONS

The present application is related to concurrently filed and commonly assigned U.S. patent applications having Ser. Nos. 12/066,867, 12/066,853 and 12/066,887. The present application is also related to U.S. Provisional patent application Ser. No. 60/718,127, filed on Sep. 16, 2005.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

The MAC layer of a DSA wireless network addresses the time varying occupancy of restricted channels/bands. To this end, the MAC layer not only must coordinate the vacating of a restricted channel/band when an incumbent device begins to occupy the channel/band, but also must coordinate the switching of the secondary devices to available restricted channels/bands or the terminating the secondary service if no channels are available. The former function is useful to ensure compliance with regulatory specifications; and the latter is useful in providing a suitable level of the quality of service (QoS) for the secondary devices.

What is needed, therefore, is a method of providing coordination of channel access in DSA wireless networks that function in restricted frequency channels and frequency bands.

In accordance with an example embodiment, in a wireless communication network, a method of wireless communication includes transmitting a broadcast medium access control (MAC) packet from a base station over a restricted channel or band; and receiving the MAC packet at a wireless station (STA) of the wireless communication network, wherein the MAC packet includes a spectrum management command.

In accordance with another example embodiment, in a wireless communication network, a method of wireless communication includes transmitting a medium access control (MAC) protocol data unit (PDU), which includes a spectrum management command, from a base station to a wireless station (STA) operating in a restricted channel or band during a downstream (DS) subframe of a communication frame; and receiving the MAC PDU at the STA and altering a function of the STA based on the spectrum management command.

In accordance with another example embodiment, a wireless communication network includes a base station (BS) operating in a restricted channel and adapted to transmit spectrum management commands; and a wireless station (STA) operating in the restricted channel and adapted to alter function based on the spectrum management commands.

The invention is best understood from the following detailed description when read with the accompanying drawing figures. It is emphasized that the various features are not necessarily drawn to scale. In fact, the dimensions may be arbitrarily increased or decreased for clarity of discussion.

As used herein the term 'restricted frequency channel' or 'restricted channel' means a frequency channel dedicated for use by primary users. The restricted channels may be portions of the communications spectrum that is licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum. Thus, certain unlicensed channels that are restricted channels are contemplated as restricted channels. In addition, so-called licensed-exempt channels, which provide priority access to certain users, are also restricted channels.

As used herein, the terms 'a' and 'an' mean one or more; and the term 'plurality' means two or more.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, or IEEE 802.15. Moreover, the network may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

Figure 1:
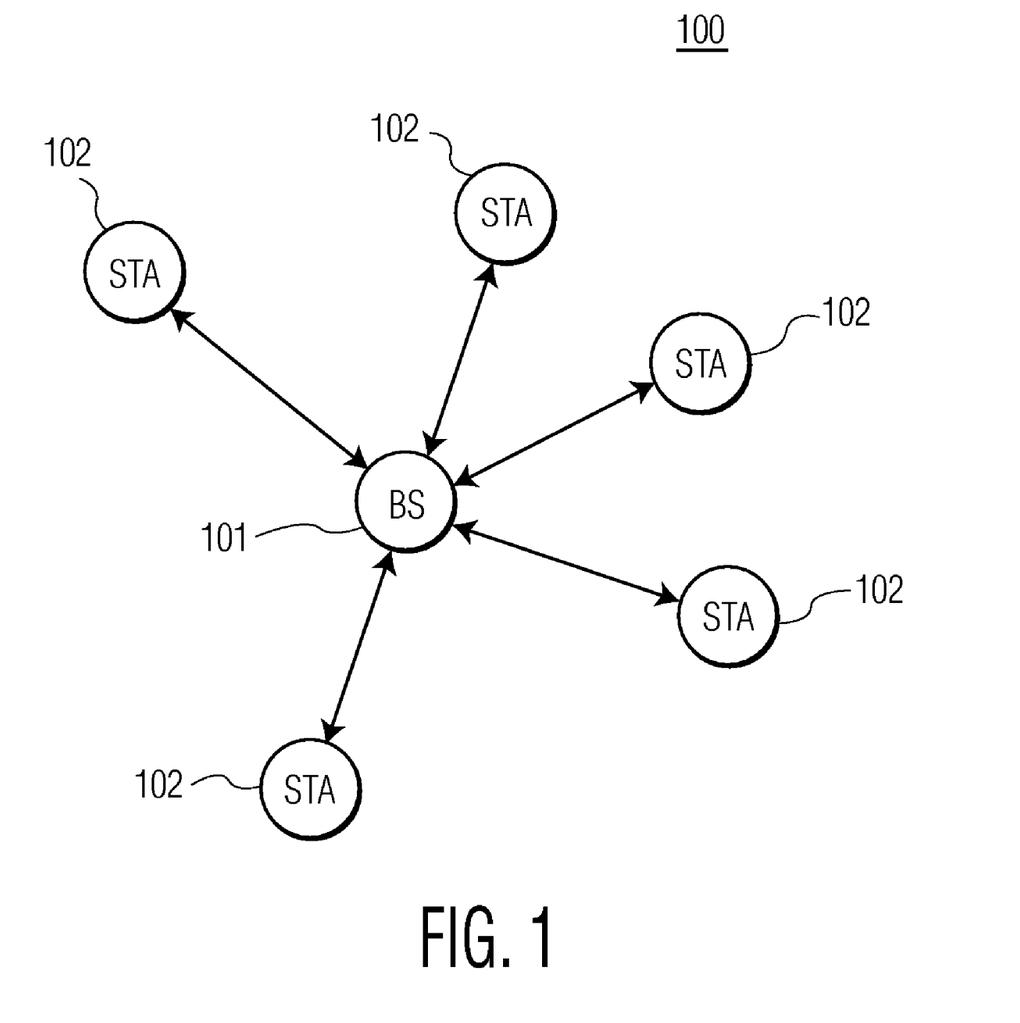
FIG. 1 is a simplified schematic diagram of a wireless communication system in accordance with an example embodiment.

FIG. 1 is a simplified schematic view of a wireless network 100 in accordance with an illustrative embodiment. In a specific embodiment, the wireless network 100 is a centralized network. However, the present teachings may be generalized to a distributed wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE).

Illustratively, the wireless network 100 may be one of the types of networks noted previously. Moreover, the STAs 102 may be computers, mobile telephones, personal digital assistants (PDA), or similar device that typically operates in such networks. In a specific embodiment, at least one of the STAs 102 is stationary. It is contemplated that the STAs 102 are adapted to function in restricted frequency channels of a frequency band that requires protection of incumbent users. As such, the BS 101 and the STAs 102 are secondary devices and the network 100 is a secondary network. Often, for simplicity restricted frequency channels and restricted channels may be referred to as 'channels.'

It is noted that only a few STAs 102 are shown; this is merely for simplicity of discussion. Clearly, many other STAs 102 may be used. Finally, it is noted that the STAs 102 are not necessarily the same. In fact, a plethora of different types of STAs adapted to function under the chosen protocol may be used within the network 100.

The DSA MAC layer methods and apparati of the example embodiments may be implemented in dynamic environments where the availability and quality of channels vary over time (e.g., new wireless technologies designed for the TV bands). Thus, the network of secondary STAs of the example embodiments beneficially obtain channel availability in a dynamic manner; and beneficially notify other secondary STAs of the occupation or future occupation of a channel by an incumbent device. As described in detail herein, the DSA MAC layer methods and apparati of the illustrative embodiments provide channel access instructions to the secondary STAs 102. Beneficially, the channel access instructions foster unfettered use of restricted channels/bands by the incumbent devices and access to restricted channels/bands by the secondary STAs.

Figure 2:
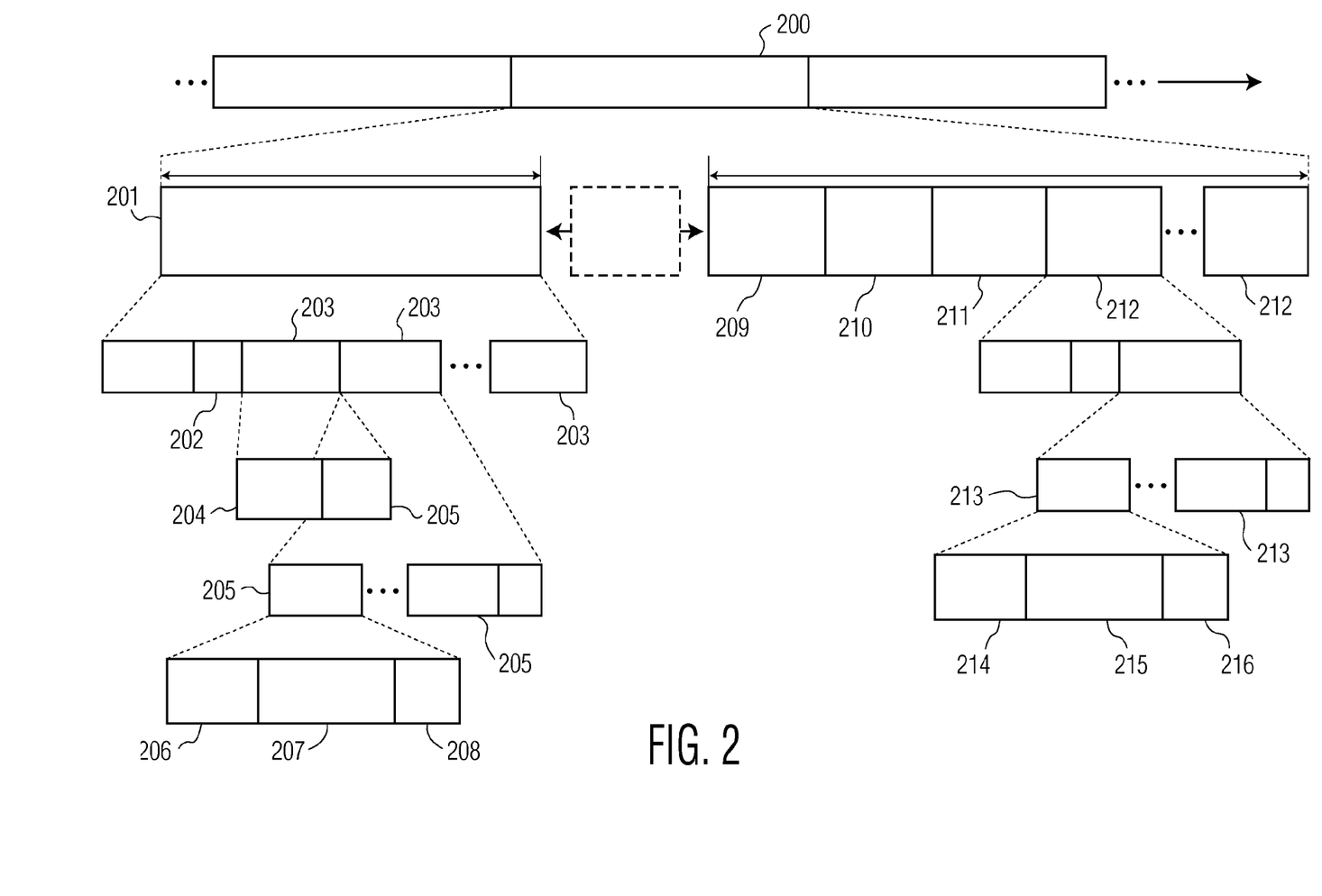
FIG. 2 is a simplified block diagram of downstream (DS) and upstream (US) communication frames in accordance with an example embodiment.

FIG. 2 is a conceptual diagram of a data frame structure that may be used by the MAC layer to regulate the medium access of the wireless network 100 of the example embodiments. The nth frame 200 comprises two portions: a predominantly downstream (DS) subframe and an upstream (US) subframe. The boundary between these two segments is adaptive, and so the control of the downstream and upstream capacity is easily effected. Beneficially, the method of medium access is thus scalable to accommodate more or fewer STAs 102, and more or fewer STAs 102 providing information to the BS 101 regarding the coexistence of incumbent devices in the wireless network 100. The downstream subframe consists of a downstream PHY protocol data unit (PDU) 201, which is a data packet transmitted over the PHY layer. The PHY PDU 201 may include contention intervals adapted to foster coexistence of the STAs 102 with the incumbent devices.

In addition, the DS PHY PDU 201 may include frame control headers (FCH) 202 and DS bursts 203. The DS bursts 203 may also include broadcast messages 204 and MAC PDUs 205. The MAC PDUs 205 may include MAC headers 206, MAC payload fields 207 and a cyclical redundancy check (CRC) fields 208.

The upstream subframe may consist of contention intervals slots 209 for initialization (e.g., initial ranging), contention slots for bandwidth request 210, Urgent Coexistence Situation (UCS) notification slots 211 and upstream PHY PDUs 212, each transmitted from different STAs 102. These PHY PDUs from different STAs 102 carry MAC PDUs 213 from the corresponding STA to the BS 101. The MAC PDUs 213 include a MAC header 214, a MAC payload field 215 and a CRC field 216. Further details of the US subframe may be found in concurrently filed U.S. patent application Ser. No. 12/006,853 entitled "Notification of Incumbent Users in Dynamic Spectrum Access Wireless Systems" the disclosure of which is specifically incorporated herein by reference.

In accordance with an example embodiment, spectrum management is effected by the BS 101 in an embedded mode. To this end, the embedded mode provides spectrum management commands via a broadcast message to all STAs 102. In a specific embodiment, the spectrum management commands may be transmitted as DS traffic via the broadcast messages 204. For example, in the beginning of the DS subframe, the BS 101 transmits broadcast frames/messages 204 that are addressed to all STAs 102. These broadcast frames may, in turn, contain spectrum management commands that provide information about channels to all STAs.

Table I illustrates exemplary data fields that can be included in spectrum management commands. In a specific embodiment, there are five control fields: Channel Action; Action Frame Number; Action Frame Count; Action Channel Number; Action Number of Channels. These control fields usefully provided embedded mode spectrum management.

TABLE I

| Name | Element ID (1 byte) | Length (bytes) | Value |
|---|---|---|---|
| Downstream_Burst_Profile | 1 | | Value reserved for the burst profile |
| BS EIRP | 2 | 2 | Signed, in units of dBm |
| Channel Number | 3 | 1 | Downstream channel number. |

TABLE I-continued

| Name | Element ID (1 byte) | Length (bytes) | Value |
|---|---|---|---|
| TTG | 4 | 1 | TTG in slots |
| RTG | 5 | 1 | RTG in slots |
| $RSS_{IR,max}$ | 6 | 2 | Initial ranging maximum received signal strength at BS in units of 1 dBm |
| BS ID | 7 | 6 | Base Station ID |
| Frame Duration Code | 8 | 1 | Time duration of the frame |
| Frame Number | 9 | 1 | The number of the frame containing the this message |
| Channel Action | 10 | 1 | Action to be taken by all CPEs in a cell.<br>0 = None<br>1 = Switch<br>2 = Add<br>3 = Remove<br>4 = Quiet |
| Action Frame Number | 11 | 1 | The starting frame number at which the Channel Action shall be performed by all stations |
| Action Frame Count | 12 | 1 | This field indicates the duration of quiet period, in units of frames. It is only valid when Channel Action = 4. Once this duration is over, normal operation resumes in the channel by the BS. |
| Action Channel Number | 13 | 1 | The starting channel number where the Channel Action shall be performed |
| Action Number of Channels | 14 | 1 | The number of channels where the Channel Action shall be performed |
| Channel Number for Backup | 15 | 1 | The backup channel to be used by CPEs in case of loss of communication with the BS due to incumbents. If possible, the backup channel shall be a disjoint set with the current operating channels. |
| Number of Channels for Backup | 16 | 1 | The number of backup channels. To maximize the success probability that the backup channel is vacant when needed, this field should be set to 1. |
| MAC version | 148 | 1 | MAC protocol version |

The control fields allow the BS 101 to fully specify to the STAB 102 the required spectrum management operation. In addition, since these fields are transmitted jointly with the other MAC control frame, less bandwidth is consumed by protocol overhead.

The Channel Action field includes a byte indicating an action to be taken by the STAs 102 (CPEs) within the network (cell). These actions include, but are not limited to: taking no action; switching to a particular channel; adding available channels; removing channels; and remaining quiet for a specified period of time. The Channel Action field applies to the channels specified in the fields Action Channel Number and Action Number of Channels, which are described below.

Illustratively, the Channel Action control field results from measurements made by the STAs 102 during a previous frame (e.g., frame n−1). The measurements may be in-band or out-of-band, with the former being effected during a quiet period and the latter being effected at any time during a frame. For example, if as a result of the measurements, the BS 101 determines that all channels are occupied, the BS 101 will select value '3' in the Channel Action field so that all STAs 102 cease operation in all channels currently in use and thus avoid interfering with the operation of incumbent devices. Alternatively, if as a result of the measurements, the BS 101 determines that one or more neighboring channels to the one(s) already in use are not occupied by an incumbent device, the BS 101 will select the value '2' in the Channel Action field so that the STAs 102 may add the available channel(s) for communication.

The Action Frame Number control field indicates the frame in which an action specified in the Channel Action control field is to occur. For example, suppose the Channel Action control field has a value of '1', indicating that all STAs 102 are supposed to switch to another channel. The Action Frame Number control field provides the frame number in which the switch is to occur. Consistent with the description above, this field would be provided during the DS subframe of frame 'n.' The Action Frame Number control field may indicate that the switch is to occur during a subsequent frame (e.g., frame n+1).

The Action Frame Count control field indicates the duration of a quiet period. For example, if periodic in-band measurements are needed, the Channel Action control field has a value of '4' and requires that all STAs 102 remain silent for a pre-determined amount of time that is typically specified by regulatory bodies, such as the FCC. The Action Frame Count control field provides the duration of this quiet period. Illustratively, the duration is quantified in frames. To with, the BS 101 will indicate that the STAs 102 of the network must remain quiet for 'x' frames (x=positive integer), or through frame n+k (k=positive integer). After termination of this period, the BS 101 resumes operation by transmitting a beacon commencing a new frame.

The Action Channel Number control field specifies the particular channel in which an action is to be taken in the Channel Action control field. For example, if the Channel Action control field has a value of '1' and the Action Channel Number control field has a channel number 3 specified, the STAs 102 of the network 100 will switch to channel 3 at subsequent frame. The Action Channel Number control field also specifies the starting channel number in certain scenarios.

The Action Number of Channels control field specifies the number of channels in which an action is to be taken. For example, if the Channel Action control field has a value of '4', the Action Channel Number control field indicates channel 3, and the Action Number of Channels control field has a value of 6, then channels 3-8 are to be quiet for specified number of frames.

The embodiments described to this point relate to the embedded mode of operation where the spectrum management commands described in connection with Table I are transmitted in a broadcast message, for example during a beacon period. Alternatively, the spectrum management commands are transmitted in another broadcast message by the BS 101. The embedded mode results in comparatively low bandwidth overhead, meaning that little bandwidth must be dedicated to the transmission of the spectrum management commands.

There may be instances where it is useful to transmit spectrum management commands to one or more specific STAs 102 in the network. For example, suppose that based on in-band or out-of-band measurements, or both indicated that a group of STAs 102 are operating in a channel with significant interference, which degrades the QoS of the STAs 102; and that another channel is vacant and would provide a better QoS for the STAs. The BS 101 may then transmit a DS burst 203, including a MAC PDU 205 that includes frames directed to spectrum management.

Illustratively, each of the transmitted spectrum management commands of the non-embedded mode of the example embodiments, are carried in a DS MAC PDU 205, which includes a destination identifier field. In DS transmissions, the destination identifier field provides the identity of the intended recipient STAs 102. Thus, only those STAs that are identified and receive the illustrative spectrum management commands take action according the instructions of the commands.

In addition to other benefits, the non-embedded mode of spectrum management provides individual and independent spectrum management commands that can be transmitted during the DS subframe. That is, contrary to the embedded mode where the transmitter has to wait for a MAC control frame in order to send a channel management command, this mode of operation allows a comparatively rapid reaction to changes in the occupation of restricted channels/bands, which is beneficial for incumbent protection and for attaining a desired QoS level in secondary STAs 102. The spectrum management commands described in connection with the non-embedded mode of the example embodiments are merely illustrative and other commands are contemplated.

Beneficially, a Transaction ID field is also included so that the BS 101 is able to handle multiple spectrum management transactions at a time (and optionally, other transactions such as channel measurements). The Transaction ID field is also included in US transmissions from the selected STAs 102 to the BS 101 such as confirmation of receipt transmissions.

One useful spectrum management command is a Channel Termination Request (CHT-REQ), which is outlined in Table II.

TABLE II

| Syntax | Size | Notes |
| --- | --- | --- |
| CHT-REQ_Message_Format | | |
| Management Message Type | 8 bits | |
| Transaction ID | 16 bits | |
| Starting Channel Number | 8 bits | |
| Number of Channels | 8 bits | |
| Confirmation Needed | 1 bit | Indicates whether the CPE is required by the BS to confirm the receipt of this message. 0 = No confirmation needed (default) 1 = Confirmation needed |
| Terminate Mode | 1 bit | Indicates any restrictions on transmission until termination of operation in a channel. The BS shall set the Terminate Mode field to either 0 or 1 on transmission. A value of 1 means that the CPE to which the frame containing the command is addressed shall transmit no further frames until the scheduled channel termination. A channel Terminate Mode set to 0 does not impose any requirement on the receiving CPE. |
| Terminate Count | 8 bits | This field shall be set to the number of frames until the BS sending the Channel Terminate message terminates the operation in the specified channels or shall be set to 0. A value of 1 indicates that termination of operation will occur immediately before the next frame. A value of 0 indicates that termination will occur at any time after the frame containing the command is transmitted. |

The CHT-REQ includes a Confirmation Needed field indicating if a confirmation of receipt of the CHT-REQ command by the wireless station(s) 102 to which the command was addressed is required by the BS 101.

The Terminate Mode field indicates any restrictions on transmission until termination of operation in a channel. In a specific embodiment, the BS 101 sets the Terminate Mode field to either '0' or '1' on transmission. A value of '1' instructs the STA 102 to which the frame containing the command is addressed not to transmit further frames until the scheduled channel termination. A Channel Terminate Mode field value set to '0' does not impose any requirement on the receiving STA 102.

The Terminate Count field indicates the number of frames until the BS sending the Channel Terminate message terminates the operation in the specified channels. The field may be set to any value greater than or equal to '0'. A value of '1' indicates that termination of operation will occur immediately before the next frame. A value of '0' indicates that termination will occur at any time after the frame containing the command is transmitted.

As can be appreciated, the CHT-REQ spectrum management command provides a relatively quick action to terminate a channel. Among other benefits, this command fosters incumbent device protection in restricted channels.

In response to the CHT-REQ spectrum management command, the STAB 102 may transmit a channel terminate response (CHT-RSP) command if so indicated by the BS 101 in the Confirmation Needed field. Illustrative data fields for such a command are shown in Table III.

TABLE III

| Syntax | Size | Notes |
| --- | --- | --- |
| CHT-RSP_Message_Format( ) { | | |
| Management Message Type | 8 bits | |
| Transaction ID | 16 bits | |
| Confirmation Code | 8 bits | Table IV |

Figure 3:
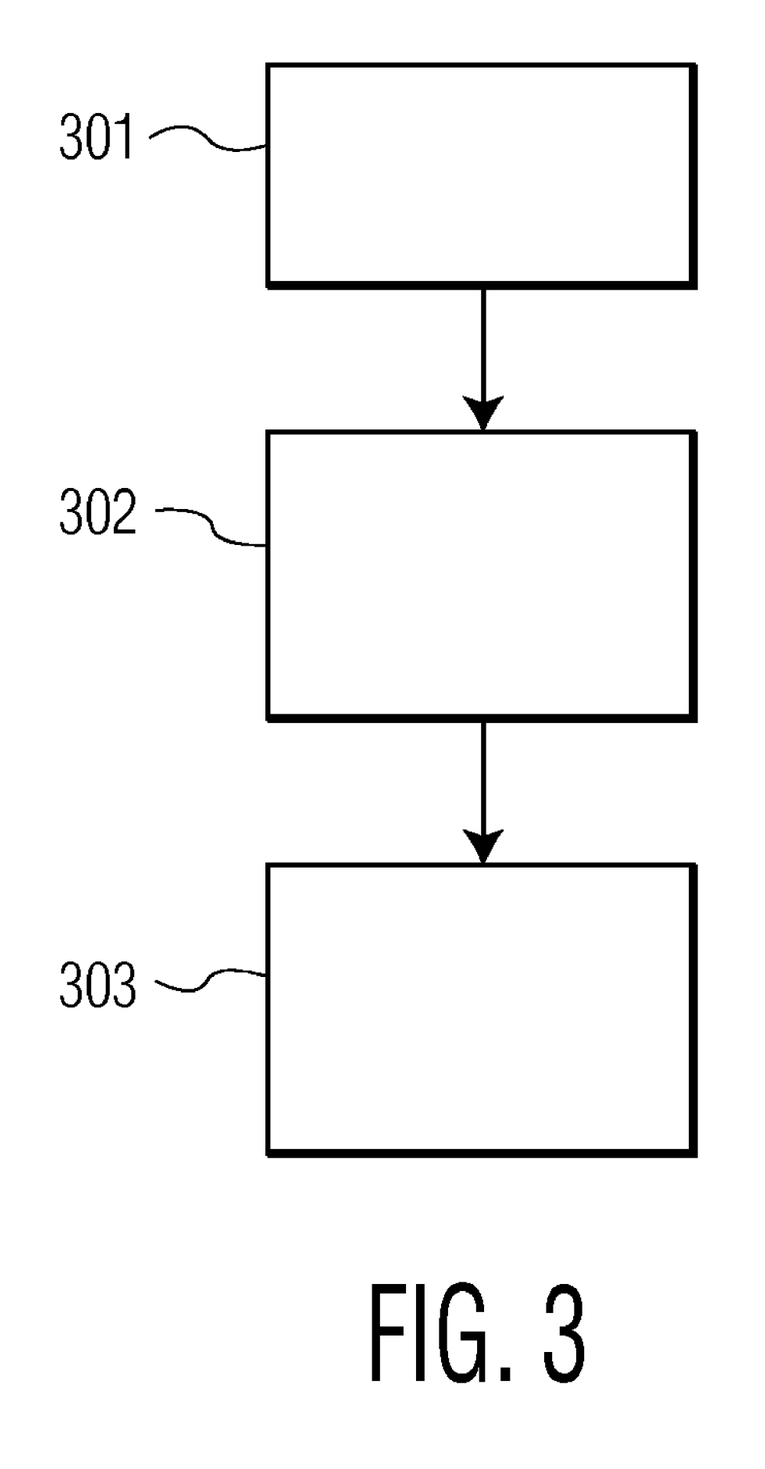
FIG. 3 is a simplified flow-chart of a method of wireless communication in accordance with an example embodiment.

Table IV illustrates fields of a confirmation code field of FIG. 3.

TABLE IV

| CC | Status |
| --- | --- |
| 0 | OK/success |
| 1 | reject-other |
| 2 | reject-unrecognized-configuration-setting |
| 3 | reject-temporary/reject-resource |
| 4 | reject-permanent/reject-admin |
| 5 | reject-not-owner |
| 6 | reject-service-flow-not-found |
| 7 | reject-service-flow-exists |
| 8 | reject-required-parameter-not-present |
| 9 | reject-header-suppression |
| 10 | reject-unknown-transaction-id |
| 11 | reject-authentication-failure |
| 12 | reject-add-aborted |
| 13 | reject-exceed-dynamic-service-limit |
| 14 | reject-not-authorized-for-the-request-SAID |
| 15 | reject-fail-to-establish-the-requested-SA |
| 16 | reject-not-supported-parameter |
| 17 | reject-not-supported-parameter-value |

As noted previously, there may be a need to add channels for use by the secondary wireless STAs 102 during operation. Based on in-band measurement and out-of-band measurements made by the STAs 101 during a quiet period or during a communication frame, the BS 101 garners information on the status of the restricted channels. As restricted channels become available (e.g., when incumbent devices vacate the channel(s)), the BS 101 may inform the STAs 102 that channels are available for use by the secondary STAs. This spectrum management command allows the addition of channel (s) to be immediate or to be scheduled for use after a set number of frames.

Table V illustrates exemplary fields of a channel add request (CHA-REQ) spectrum management command according to an example embodiment. This command is transmitted in the non-embedded mode of operation and is transmitted to a select one or more wireless STAs 102 of the network 100.

TABLE V

| Syntax | Size | Notes |
| --- | --- | --- |
| CHA-REQ_Message_Format | | |
| Management Message Type | 8 bits | |
| Transaction ID | 16 bits | |

TABLE V-continued

| Syntax | Size | Notes |
| --- | --- | --- |
| Starting Channel Number | 8 bits | |
| Number of Channels | 8 bits | |
| Confirmation Needed | 1 bit | Indicates whether the CPE is required by the BS to confirm the receipt of this message. 0 = No confirmation needed (default) 1 = Confirmation needed |
| Addition Count | 8 bits | This field either shall be set to the number of frames until the BS sending the Channel Add message adds the new channels or shall be set to 0. A value of 1 indicates that the addition will occur immediately before the next frame. A value of 0 indicates that the addition will occur at any time after the frame containing the command is transmitted. |

The fields noted in Table V are rather self-explanatory. However, specific discussion of the Addition Count field is useful. The Addition Count field provides the timing of the addition of the restricted channels. As noted, the field may include a value equal to the number of frames post the present frame that the addition is to occur. This flexibility is included to give enough time for the STAs 102 to schedule the change in their operating parameters. Notably, a field value of '1' indicates action immediately before the next frame; and a field value of '0' indicates action at any time after reception of the spectrum management command.

Optionally, a confirmation message may be sent by the STAs in response to the receipt of a CHS-REQ. This message shall only be transmitted by the STAs if the Confirmation Needed field in the received CHS-REQ is set. Table VI illustrates exemplary fields of a confirmation message of an example embodiment.

TABLE VI

| Syntax | Size | Notes |
| --- | --- | --- |
| CHS-RSP_Message_Format( ) { | | |
| Management Message Type | 8 bits | |
| Transaction ID | 16 bits | |
| Confirmation Code | 8 bits | See Table IV |

As noted, the DSA systems of the example embodiments provide protection of incumbent devices, while providing service to secondary STAs 102. One method that may be implemented as needed to meet these desired ends requires a channel switch spectrum management command. In a channel switch in the non-embedded mode, one or more STAs may be required to switch operations from a current restricted channel or band to another restricted channel or band. In certain circumstances, the BS 101 and all STAs 102 of its network may have to switch to ensure protection of the incumbent device(s) and service in the wireless network. Table VII illustrates exemplary fields of a channel switch request (CHS-REQ) spectrum management command of an example embodiment.

TABLE VII

| Syntax | Size | Notes |
|---|---|---|
| CHS-REQ_Message_Format( ) | | |
| Management Message Type | 8 bits | |
| Transaction ID | 16 bits | |
| Starting Channel Number | 8 bits | |
| Number of Channels | 8 bits | |
| Confirmation Needed | 1 bit | Indicates whether the CPE is required by the BS to confirm the receipt of this message.<br>0 = No confirmation needed (default)<br>1 = Confirmation needed |
| Switch Mode | 1 bit | Indicates any restrictions on transmission until a channel switch. The BS shall set the Switch Mode field to either 0 or 1 on transmission. A value of 1 means that the CPE to which the frame containing the command is addressed shall transmit no further frames until the scheduled channel switch. A Channel Switch Mode set to 0 does not impose any requirement on the receiving CPE. |
| Switch Count | 8 bits | This field either shall be set to the number of frames until the BS sending the Channel Switch message switches to the new channel or shall be set to 0. A value of 1 indicates that the switch will occur immediately before the next frame. A value of 0 indicates that the switch will occur at any time after the frame containing the command is transmitted. |

In many frames a quiet period is provided to perform in-band measurements. During the quiet period, the STAs refrain from transmitting and garner data from measurements. The result from these in-band measurements are provided to the BS 101 during a notification period. In the non-embedded mode of an example embodiment, a channel quiet request (CHQ-REQ) spectrum management command is transmitted by the BS 101 to one or more selected STAs 102. The CHQ-REQ spectrum management command prohibits any transmission activity in channel(s) currently used by the BS 101 for communication with its associated STAs. Table VIII illustrates exemplary fields of the CHQ-REQ spectrum management command of an example embodiment.

The CHQ-REQ message is sent by the BS in order to quiet any transmission activity in channel(s) currently used by the BS 101 for communication with its associated STAs 102. Transmission of this message may be due to several reasons such as the need to quiet the channel(s) to perform in-band measurements.

TABLE VIII

| Syntax | Size | Notes |
|---|---|---|
| CHQ-REQ_Message_Format( ) | | |
| Management Message Type | 8 bits | |
| Transaction ID | 16 bits | |
| Confirmation Needed | 1 bit | Indicates whether the CPE is required by the BS to confirm the receipt of this message.<br>0 = No confirmation needed (default)<br>1 = Confirmation needed |
| Quiet Count | 8 bits | Shall be set to the number of frames until the next quiet interval shall start. A value of 1 indicates the quiet interval will start at the next frame. A value of 0 is reserved. |
| Quiet Offset | 8 bits | Shall be set to the offset of the start of the quiet interval from the start of the frame specified by the Quiet Count field, expressed in slots. The value of the Quiet Offset field shall be less than one frame length. |
| Duration | 16 bit | Shall be set to the duration of the quiet interval, expressed in slots. |
| Quiet Period | 8 bits | Shall be set to the number of frames between the start of regularly scheduled quiet intervals defined by this Quiet command. A value of 0 indicates that no periodic quiet interval is defined. |
| Number of Quiet Period Purposes | 3 bits | Number of quiet period purposes as included below |
| Quiet Period Purpose IEs | 24 bits | One or more quiet period purpose IEs. See Table IX. |

TABLE IX

| Syntax | Size | Notes |
| --- | --- | --- |
| Quiet_Period_Purpose_Format | | |
|   Element ID | 8 bits | |
|   Length | 8 bits | |
|   Type of Purpose | 1 bit | Indicates the type of the purpose.<br>0 = Incumbent (default)<br>1 = 802.22 |
|   Purpose | 3 bits | Indicates the purpose of the quiet period. The meaning of this field depended upon the value of the Type of Purpose field.<br>If Type of Purpose = 0<br>Bit #0 (MSB): If set, the CPE shall perform TV service measurement<br>Bit #1: If set, the CPE shall perform Wireless Microphone measurements<br>Bit #2: If set, the CPE shall perform WMB measurements<br>If Type of Purpose = 1<br>Bit #0 (MSB): If set, the CPE shall perform 802.22 CBP measurements<br>Bit #1: If set, the CPE shall perform 802.22 BS beacon measurements<br>Bit #2: Undefined |
|   Fraction | 4 bits | In ascending order, indicates the fraction of the total Quiet Period Duration (Table VIII) that is dedicated for this specific purpose. The sum of the Fractions of all quiet periods purposes shall not exceed 100%. The CPE is free to use any unassigned fraction as it sees fit.<br>0000    0%<br>0001    10%<br>0010    20%<br>0011    30%<br>0100    40%<br>0101    50%<br>0110    60%<br>0111    70%<br>1000    80%<br>1001    90%<br>1011    100%<br>Others  Undefined |

After transmission of the CHQ-REQ, the BS 101 may require that a channel quiet response (CHQ-RSP) be sent by the intended receiving STAs 102. This requirement will be set, if at all, in the Confirmation Needed field of the CHQ-REQ spectrum management command. After successful receipt of this command, the BS 101 will transmit a confirmation. Table X illustrates exemplary fields of the CHQ-RSP spectrum management command of an example embodiment.

TABLE X

| Syntax | Size | Notes |
| --- | --- | --- |
| CHQ-RSP_Message_Format | | |
|   Management Message Type | 8 bits | |
|   Transaction ID | 16 bits | |
|   Confirmation Code | 8 bits | Table IV |

Spectrum management of restricted channels supporting wireless stations described in connection with the example embodiments allows the wireless systems to substantially efficiently and dynamically use the available channels as the occupation of channels by incumbent devices varies.

Spectrum management commands provided in the spectrum management commands of the example embodiments are usefully treated with high priority in both the MAC layers of the transmitter and the receiver, especially when the protection of incumbent services is desired. Once the BS 101 detects the presence of an incumbent service/device in a restricted channel/band, one or more of the spectrum management commands are provided to one or more STAs 102 via an embedded mode transmission or a non-embedded mode transmission. Depending of the urgency of the spectrum management commands, the BS 101 usefully calculates the expected time the spectrum management message should arrive at the receivers and appropriately set the scheduling fields (e.g., count, offset, duration, period) in the message header. This will dictate the urgency of the message, and how it shall be treated at the receivers.

Also, depending upon the situation, reception of spectrum management commands by all STAs 102 involved may be required by the BS 101. In this case, the BS 101 shall set the Confirmation Needed field existing in the spectrum management commands. This allows the BS 101 to specifically request the STAs 102 to transmit a confirmation message.

FIG. 3 is a flow-chart of a method of wireless communication in accordance with an example embodiment. As step 301, the BS 101 obtains measurement information from the STAs 102 of the wireless network. This information may be garnered from in-band and out-of-band measurements performed by the STAs 102 as described previously.

At step 302, after determining the appropriate action required as a result of the measurement information garnered in step 301, the BS transmits appropriate spectrum management commands. These commands are as described in connection with the example embodiments described previously, and may be transmitted in a broadcast manner (embedded mode), or in a targeted manner (non-embedded mode), or both.

Once the destination STA 102 receives the spectrum management command from the BS 101, the STA 102 provides higher priority for these commands. As such, the STA 102 shall inspect the message control fields and proceed as instructed by the BS 101. If a confirmation is needed (e.g., in case of transmissions of individual messages, which can be unreliable), the receiver shall immediately send back a response message to the BS with the appropriate Confirmation Code. If a required acknowledgement message is not received within a pre-determined timeout, the BS 101 may send another spectrum management command to the STA 102 in question. The STAs also check the scheduling fields in the spectrum management command in order to ascertain how urgent the action required is, and how the action should be treated internally.

At step 303, the STAs 102 that received the spectrum management command(s) then implement the action commanded. The STA 102 shall then change operating parameters, at the scheduled time, as instructed by the BS 101. Illustratively, the actions include, but are not limited to: no action; switching to another channel or band; adding a channel for use by the STA; removing a channel for use by the STA; ceasing operation in a channel or in a band; entering a quiet period. These actions are in keeping with the example embodiments described previously.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. In a wireless communication network, a method of wireless communication, comprising:
   transmitting a broadcast medium access control (MAC) packet from a base station over a restricted channel or band; and
   receiving the MAC packet at a wireless station (STA) of the wireless communication network, wherein the MAC packet includes a spectrum management command, wherein said spectrum management command includes a channel action field configured to inform the STA of an action to be taken, and wherein the action is one of taking no action and adding a channel for use by the STA.

2. A method as recited in claim 1, wherein the spectrum management command further comprises channel backup number field.

3. A method as recited in claim 1, further comprising, after the receiving taking an action based on the value of the field.

4. A method as recited in claim 3, wherein the action further includes one of switching to another channel or band, removing a channel for use by the STA, ceasing operation in a channel or in a band, and entering a quiet period.

5. A method as recited in claim 4, further comprising, setting a starting channel number in which the action is to be performed.

6. A method as recited in claim 5, further comprising setting the number of channels in which the action is to be performed.

7. A wireless communication network, comprising:
   a base station (BS) operating in a restricted channel and configured to transmit spectrum management commands; and
   a wireless station (STA) operating in the restricted channel and configured to alter its function based on the spectrum management commands, wherein said spectrum management command includes a channel action field configured to inform the STA of an action to be taken, and wherein the STA is configured to perform one of taking no action and adding an available restricted channel or band for use by the STA, wherein the STA is configured to perform the one or more actions based on the spectrum management commands.

8. A wireless communication network as recited in claim 7, wherein the STA is further configured to terminate the operating based on the spectrum management commands.

9. A wireless communication network as recited in claim 7, wherein the STA is further configured to remove channels or bands based on the spectrum management commands.

10. A wireless communication network as recited in claim 7, wherein the STA is further configured to switch the operating to another restricted channel based on the spectrum management commands.

11. A wireless communication network as recited in claim 7, wherein the spectrum management commands are included in a broadcast message.

12. A wireless communication network as recited in claim 7, wherein the spectrum management commands are transmitted from the BS to the wireless station in a medium access control (MAC) protocol data unit (PDU).

13. In a wireless communication network, a method of wireless communication, comprising:
   transmitting a medium access control (MAC) protocol data unit (PDU), which includes a spectrum management command, from a base station (BS) to a wireless station (STA) operating in a restricted channel or band during a downstream (DS) subframe of a communication frame;
   receiving the MAC PDU at the STA and altering a function of the STA based on the spectrum management command, wherein the altering comprises one of taking no action and adding an available restricted channel.

14. A method as recited in claim 13, wherein the altering further comprises one of terminating transmission from the STA, switching from the restricted channel to another restricted channel, and removing the restricted channel.

15. A method as recited in claim 13, wherein the altering is effected before a termination of the communication frame.

16. A method as recited in claim 13, wherein the altering is effected substantially immediately after the receiving.

17. A method as recited in claim 13, further comprising:
   setting a value corresponding to a number of communication frames after a termination of the communication frame that the altering is effected.

18. A method as recited in claim 13, wherein the MAC PDU includes a destination identifier field that identifies the STA.

* * * * *